INVENTOR.
JOHN C. HOVEKAMP

INVENTOR
JOHN C. HOVEKAMP

May 19, 1970 — J. C. HOVEKAMP — 3,512,626
FEEDER MEANS

Original Filed Feb. 19, 1968

INVENTOR
JOHN C. HOVEKAMP

United States Patent Office 3,512,626
Patented May 19, 1970

3,512,626
FEEDER MEANS
John C. Hovekamp, Elyria, Ohio, assignor, by mesne assignments, to James Talcott, Inc., New York, N.Y., a corporation of New York
Original application Feb. 19, 1968, Ser. No. 706,429. Divided and this application Oct. 15, 1968, Ser. No. 767,687
Int. Cl. B65g *19/02*
U.S. Cl. 198—170      2 Claims

ABSTRACT OF THE DISCLOSURE

Adjustable high speed feeders for printing presses and other purposes wherein the articles to be printed, or otherwise treated or acted upon, are delivered singly from a feed or supply stack to a pick-off point or station; method and means for causing a dwell in the movement of a single article on a continuously moving feeder, and/or of advancing or retracting adjacent individual articles on a continuously moving feeder, relative to each other, in the direction of their travel; and means to precondition the surface of moving articles by heating to ready the same for further treatment while protecting the articles from deleterious effect due to engagement with excessively heated portions of the apparatus.

CROSS REFERENCES TO RELATED APPLICATIONS

This application is a division of applicant's co-pending application, Ser. No. 706,429 filed Feb. 19, 1968, now abandoned.

BACKGROUND OF THE INVENTION

In its total preferred form this invention relates to high speed feeder means for printing presses and the like for receiving articles, seriatim, from a dispenser and delivering them in a state of dwell to a pick-off point for further treatment, such as printing on the surface thereof, and including means for preconditioning the surface for such further treatment without deleteriously effecting the articles.

SUMMARY OF THE INVENTION

Objects of this invention include the provision of a new and improved horizontal feeder for printing presses, and other purposes, in which pushers are provided to move each individual and respective article to be printed, or otherwise acted upon, in timed sequence to a pick-off point or station; the provision of such a feeder in which said pushers have a dwell so as to hold the article stationary at the moment of pick-off or delivery to the next station of the apparatus or other apparatus; the provision of such a feeder in which the pushers positively advance and position each individual article to be printed or otherwise acted upon; the provision of such a feeder which is readily adapted to have a plurality of pushers in side by side relationship whereby a plurality of parallel lines of individual articles may be advanced to a plurality of parallel pick-off points or positions to the end that one printing head, or other apparatus, or series of printing heads, or other apparatus, may simultaneously print, or otherwise act upon a plurality of articles to be printed, or acted upon; the provision of such a feeder in which the pushers are automatically timed in relation to the dispensing means of the feeder or other apparatus, if any, which deposits the articles to be conveyed by the horizontal feeder onto the horizontal feeder; and the provision of such a feeder which includes new and improved means for providing a dwell in the travel of a moving pusher in a continuously moving feeder and/or a new improved means by which adjacent pushers, and the respective articles being moved thereby, in a continuously moving feeder are caused to advance or retract relative to each other and the in the direction of travel.

Further objects of this invention include the provision of new and improved feeder for printing presses, and other purposes, having pushers for moving the articles to be fed in a predetermined direction, which are driven by an endless chain, belt or the like; the provision of such a feeder which has new and improved means for providing intermittent motion or dwell to the individual pushers and the articles which are being fed thereby, respectively; which has new and improved means for tripping, turning over, and erecting the pushers, whereby the pushers advance the articles to be fed by means of an endless chain and return beneath the surface of the feeder and are re-erected to advance another article in a similar manner; and the provision of such a feeder in which a plurality of articles are advanced in predetermined sequence through the feeder.

Still further objects of this invention are the provision of a new and improved method and means whereby adjacent articles, pushers, or the like, are moved or advanced in a predetermined lineal direction and, while being continuously moved en masse, are caused to advance or retract or have intermittent motion relative to each other, in the direction of travel, and whereby the nature and degree of advancement, retraction of intermittent motion or dwell of adjacent articles is of predetermined length.

Still further objects of this invention are to provide a new and improved printing press, and the like, to provide new improved horizontal and vertical feeders for printing presses, and other apparatus, to provide new and improved mechanism for providing for the respective dwell, or advancement or retraction, of adjacent articles being fed in a lineal direction, relative to each other and relative to the direction of travel, and to provide apparatus of such nature, respectively, obtaining one or more of the objects and advantages set forth above.

Other objects of this invention include the provision of a new and improved feeder for printing presses, and the like, which includes means for preconditioning the surface of the article to be printed, or otherwise treated, by heating the same and the provision of a feeder including such surface preconditioning means including means to protect the articles against deleterious effects from excessive heat as due to contact or engagement with excessively heated parts and portions of the feeder.

Still further objects of this invention include the provision of feeders and apparatus obtaining one or more of the objects and advantages set forth above which are more efficient and effective than feeders for similar purposes previously known and used; which are simple and effective in operation; which have markedly and unexpectedly higher feed rates, on an articles per minute basis, than feeders for similar purposes previously known and used in the art; and which have new and improved means by which articles are delivered, by a continously moving feed mechanism, in a state of dwell to a pick-off point or station to provide improved, more efficient register with the pick-off apparatus.

These and other objects and advantages of this invention will appear from the following description of preferred forms thereof, reference being had to the accompanying drawings.

Figure 1:
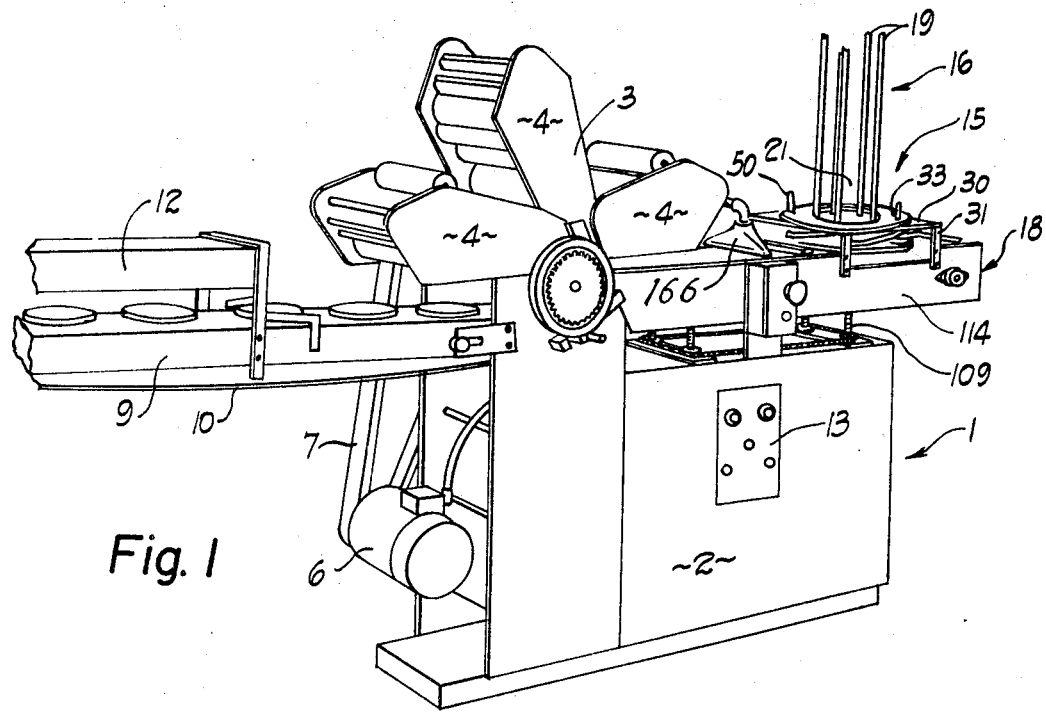
FIG. 1 is a perspective view of a printing press, including horizontal and vertical feeders embodying preferred forms of this invention.

A printing press, including feeder means embodying this invention, is indicated generally at 1 FIG. 1, and also, includes a stand 2, for supporting the press, a printing head portion 3, having 1 or more, three shown, printing heads 4, of any conventional type for offset printing, for example. Press 1 also includes a motor 6, which is mounted on stand 2 in a conventional manner and is adapted to drive the printing heads 4 and other apparatus. A conveyor 9, having an endless belt or webbing 10 thereon, is adapted to receive the articles after the same have been printed, or otherwise acted upon, by the printing head portion 3 and convey them from the printing head portion 3, beneath one or more conventional dryers 12, to a stacking or receiving position, not shown. Conveyor 9 is also driven by suitable motor means, not shown. Stand 2, also, conveniently includes a console portion 13 wherein the basic electrical controls for the motor and apparatus are conveniently located.

All of the above is old in the art and, per se, forms no part of the present invention. Printing press 1 is shown in use with a feeding mechanism, indicated generally at 15, embodying both a vertical feeder, indicated generally at 16, and a horizontal feeder, indicated generally at 18. The vertical feeder 16, shown and described fully in Hovekamp Pat. No. 3,426,941, dispenses the articles to be acted upon in the proper timed relation, onto horizontal feeder 18 for conveyance, and a full and adequate understanding of the vertical feeder may be obtained from said patent.

Further, while feeders 16 and 18 are shown embodied in a common feeder 15 and in use with printing press 1, it is to be understood that the feeder 15 and/or feeders 16 and 18, respectively, and/or all or part of the apparatus embodying all or part of this invention may be used with or adapted for use with other apparatus, and other apparatus may be used with or adapted for use with feeder 15, feeders 16 and 18, respectively, all or part of the structure thereof embodying this invention and/or all part of this invention, without departing from the scope and purpose of this invention.

Figure 2:
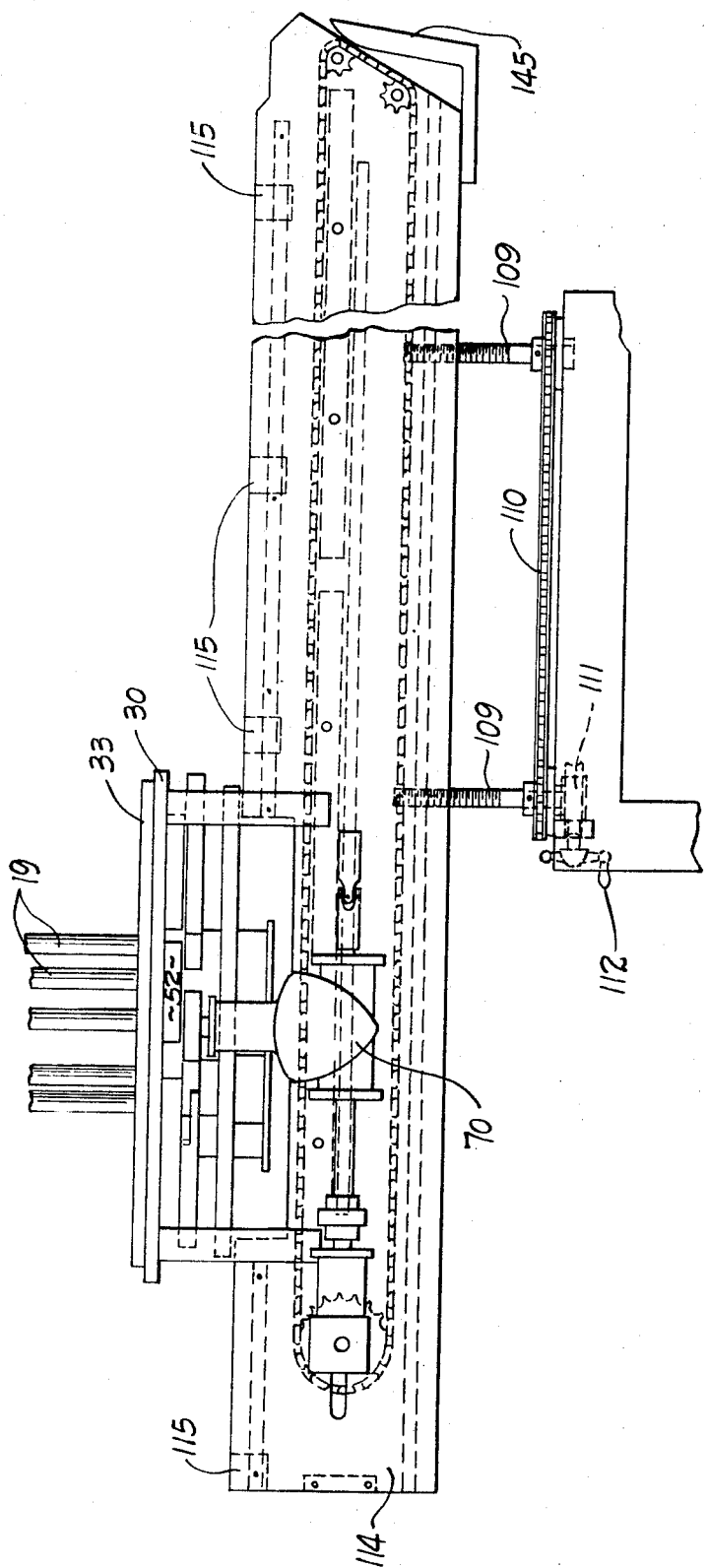
FIG. 2 is a side view, partly schematic, showing the relationship of the horizontal feeder with respect to the vertical feeder.

Drive shaft 71, show in FIG. 2 of Hovekamp Pat. No. 3,426,941 for driving the vertical feeder mechanism, also drives connecting shaft 104 and thence, via gearbox 105, shaft 106 which extends transversely of horizontal feeder 18 and has mounted thereon for rotation therewith transversely spaced sprocket wheels 107 and 107' which drive the horizontal feeder 18, as will hereinafter more fully appear.

Thus, vertical and horizontal feeders 16 and 18, respectively, are in proper coordinated relationship so that the feed of each article or lid, as it is dispensed from the vertical feeder 16, will be deposited in proper position on the horizontal feeder 18, so that only one article or lid is delivered at a time to the pick-off point in any linear row of articles being delivered and so that the feeders are maintained in unison and in proper timed relationship as the motor is speeded up or slowed down at the discretion of the user. Further, the nature and structure of the feeders 16 and 18, respectively, embodying this invention are such that as many as 800 articles, such as package lids having a recessed top (similar to those commonly used on cottage cheese, cheese dip and other items), are delivered, seriatim and in a state of dwell, to the pick-off point per minute, for each vertical feeder 16 and each lineal row of articles on horizontal feeder 18.

Horizontal feeder 18 comprises a base plate 108 which is supported on stand 2 by suitable adjustable threaded supports or screws 109. Supports 109 are conveniently driven in unison by chain 110, FIG. 2, by means of gear 111 and handle 112 so that the base plate is held in position, horizontally, while being readily and easily adjusted vertically to raise and lower the entire feeder 18 so that the top of the articles being conveyed or fed to the pick-off point or station will be in the same vertical plane, regardless of the thickness of the articles themselves.

Figure 3:
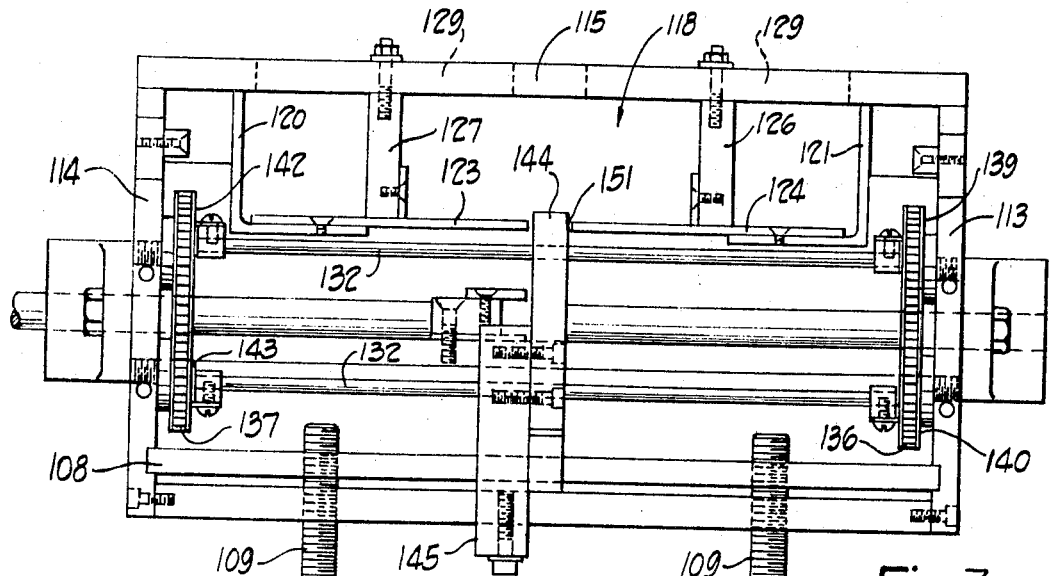
FIG. 3 is a front elevation of a horizontal or conveyor feed mechanism embodying a preferred form of this invention.
Figure 4:
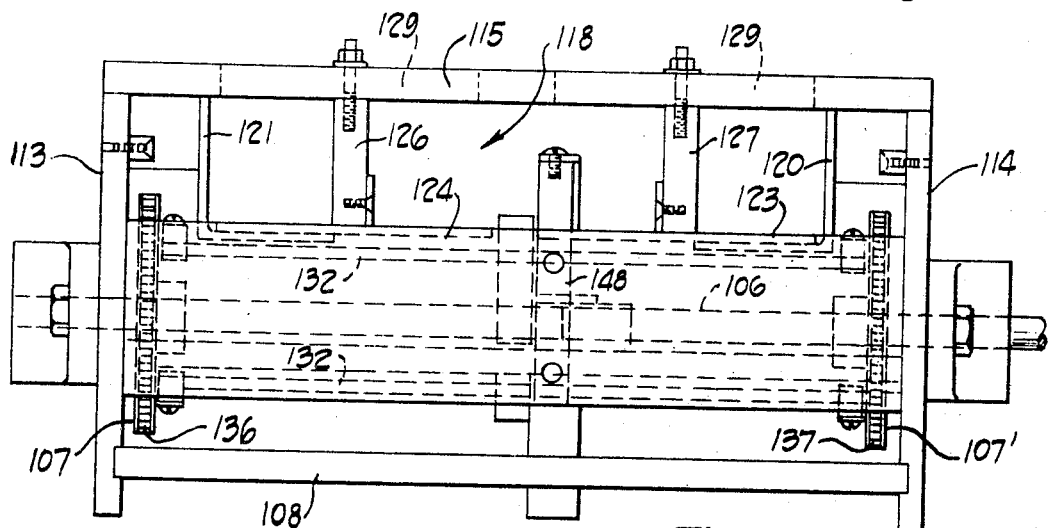
FIG. 4 is rear elevation of the horizontal or conveyor feed mechanism shown in FIG. 3.

Horizontal feeder 18 also comprises side members 113 and 114, respectively, FIGS. 3 and 4, which are adapted to slide on base plate 108 so that the feeder 18 is easily and readily pushed into and pulled out of position to deliver the articles to the pick-off position, for servicing, adjustment or other reasons. A suitable lock, not shown, holds the feeder in place when the same is pushed into the normal operative position, as in FIG. 1. A plurality of tie bars 115 and a central tie plate member 117 extend between the upper edges of sides 113 and 114 to hold the same in a position, provide a rigid whole and to cooperate with and function as a part of the feed mechanism, as will hereinafter more fully appear.

Tie bars 115 have suspended therefrom the article cage, indicated generally at 118, within which the articles are confined as they are advanced through the feeder 18 from the point of reception from feeder 16 to the pick-off point at the fore end, rightward end, as viewed in FIG. 2, of feeder 18.

Cage 118 comprises angle irons 120 and 121 extending longitudinally at each side of feeder 18 and supporting plates or deck members 123 and 124, respectively, upon which the articles being fed ride and by which they are directly supported while in feeder 18. In addition, cage 118, also, comprises left and right side guides 126 and 127, respectively, which are adjustable laterally in and out, in suitable slots 129 in tie bars 115, for positioning in accordance with the diameter of the articles being conveyed through the feeder. Cage 118 has a height somewhat greater, as desired, than the thickness of thickest articles to be conveyed and guides 126 and 127 are so arranged as to snugly engage the articles adjacent the pick-off point so that they do not coast at the end of their travel, but are at rest at the pick-off point.

Figure 5:
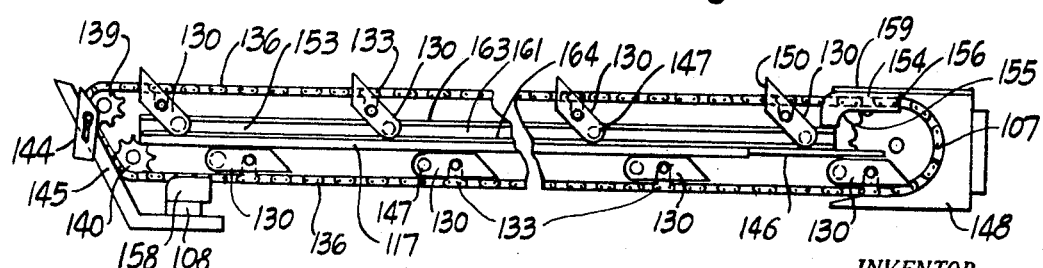
FIG. 5 is a diagrammatic, longitudinal section showing the operation of the horizontal or conveyor feed mechanism shown in FIG. 3 including the apparatus for providing a dwell to successive articles at the pick-off point and/or advancing or retracting successive articles relative to each other and the direction of travel.

The articles are conveyed through feeder 18, individually, by means of a plurality of pushers 130, FIG. 5, each of which engages behind an article as it is deposited on decks 123 and 124, beneath vertical feeder 16, and pushes it to the pick-off position overhanging the forward end, leftward end as viewed in FIG. 5, of feeder 18 in a position of dwell.

Each pusher 130 is rotatably mounted on a transversely extending shaft or pusher rod 132, which is supported at each end by links 133, which are in turn rigidly mounted on chains, or similar endless drive means, 136 and 137, respectively. Chains 136 and 137 are mounted on and driven by sprockets 107 and 107', respectively, at the rearward end of feeder 18.

Conveyor chains 136 and 137 pass over and are supported by upper and lower front sprocket wheels 139 and 140 and 142 and 143, respectively. Lower front sprockets 140 and 143, respectively, are slightly to the rearward of upper front sprockets 139 and 142, respectively, in order to give the pushers 130 both a downward and rearward motion as they are carried away from the pick-off point by pusher rods 132, respectively.

Further, in order to bring each article to a dwell as it reaches the pick-off point, a cam 144, mounted on support 145 which is in turn secured to plate 108, is provided in the path of travel of the pushers 130 to engage the pushers 130 succesively and rotate them clockwise, as viewed in FIG. 5, about their respective shafts 132 to separate each pusher from the article being pushed thereby and bring the article to a stop or dwell as pushing ceases and the article is squeezed between the side guides 126 and 127. Further advancement of the pushers 130 is also halted because the length of links 133 is equal to the radius of the sprockets 139 and 142. Thus, once each shaft 132 is aligned with the axis of the said sprockets and the links are positioned to cause this alignment, the shaft 132 and respective pusher 130 remain motionless at the center of the sprockets while the links 133 advance around the sprockets with the chains 136 and 137, respectively, and until the links 133 begin their downward travel toward the lower sprockets 140 and 143, respectively. Thus, while shaft 132 remains on the axis of sprockets 139 and 142 it does not move and so the pushers mounted thereon also remain stationary. The length of the dwell can be varied by increasing or decreasing the radius of the sprockets and during the dwell the next succeeding article advances relative to the stationary article and until the next apparatus picks off the stationary article at the pick-off point. Further, adjacent articles may be either advanced or retracted relative to each other by using links on the chains which extend radially, in terms of sprockets 139 and 142, in or out (for narrowing or increasing the gap between adjacent articles, respectively), as an article will then move either slower or faster than the chains which ultimately provide its motive power. Note, also, that the conveyor or drive chains are moving continuously and at fixed or, at least, predetermined speed, during the dwell or other relative movement between adjacent articles. Thus, an article is brought to a standstill or dwell in a feeder embodying this feature of the invention even though the feeder itself be in continuous operation and the drive chain or similar means be moving continuously.

The operation and sequence of operation of the pushers 130 is best understood by reference to FIG. 5.

Starting at the lower center pusher 130 travels along beneath central tie plate 117 toward the rear of the apparatus, being held in the position shown by the plate 117.

As pusher 130 approaches the rearward end, rightward end as viewed in FIG. 5, of its travel, the chains 136 and 137 go around sprockets 107 and 107', respectively, carrying pusher rod 132 with them, thereby lifting the pusher up and over plate 117 and, more particularly, a projection or finger 146 extending longitudinally therefrom. At the same time, cam follower 147, rotatably mounted at one end of pusher 130 and extending therefrom, into the paper as viewed, engages cam 148, which thereby rotates the pusher to erect the same and ensure that the pusher's upper and leading edge 150 is perpendicular and thus properly positioned for engaging an article, as shown.

Further, pusher 130 is maintained in proper erected position, as it advances across feeder 18, with its leading edge perpendicular and extending above decks 123 and 124 through slot 151 defined thereby, FIG. 3, by means of cam follower 147 engaging and traveling within track, guideway, or longitudinal cam 153. A cam follower 147 is positively positioned and located within guideway 153 by cam 154. Cam 154 is turned upward, or counterclockwise, as viewed, by the pusher rod 132 engaging against surface 155 whereupon end 156 of cam 154 strikes cam follower 147 and directs it into guideway 153. A spring, not shown, returns cam 154 to the position shown, once pusher rod 132 passes and cam follower 147 has been properly seated in guideway 153. Guideway 153 conveniently extends for substantially the entire length of feeder 18 and terminates just rearwardly of the forward end of the feeder so that the travel of the pusher 130 may be stopped when it has properly located the article being moved thereby, at the exactly correct position for pick-off, a position wherein preferably over one half of the article is supported on the cage deck at the time of pick-off and wherein the clockwise rotation of the pusher induced by cam 145 will not be prevented by cam follower 147 being disposed in guideway 153.

Once the dwell of pusher rod 132, and, therefore, of pusher 130, is completed, the pusher advances downwardly and rearwardly around, in essence, lower sprockets 140 and 143 and, as the pusher starts rearwardly, the lower half of pusher 130 (or cam follower 147) strikes cam 158, which rotates the pusher clockwise thereby clearing the next pusher approaching the pick-off point and tucking the pusher beneath plate 117, and the cycle is repeated.

A stop 159 prevents cam 154 from rotating in the wrong direction and the action of cam 144 and the dwell caused by the pusher rod 132 and the link structure, viz-a-viz the diameter of the upper forward pulleys, ensures that each article is positively positioned in the same position for pick-off.

The distance between adjacent pushers is sufficient to receive the largest diameter article for which the apparatus is designed.

Guideway 153 conveniently comprises a laterally opening U-shaped member comprising a base 161 and upper and lower plate members 163 and 164, respectively.

Conveyor 18, also, conveniently includes a gas burner 166, FIG. 1, which is positioned to direct flame and/or heat toward or against the surface of the article to be printed to condition or precondition the said surface for printing thereupon.

Figure 6:
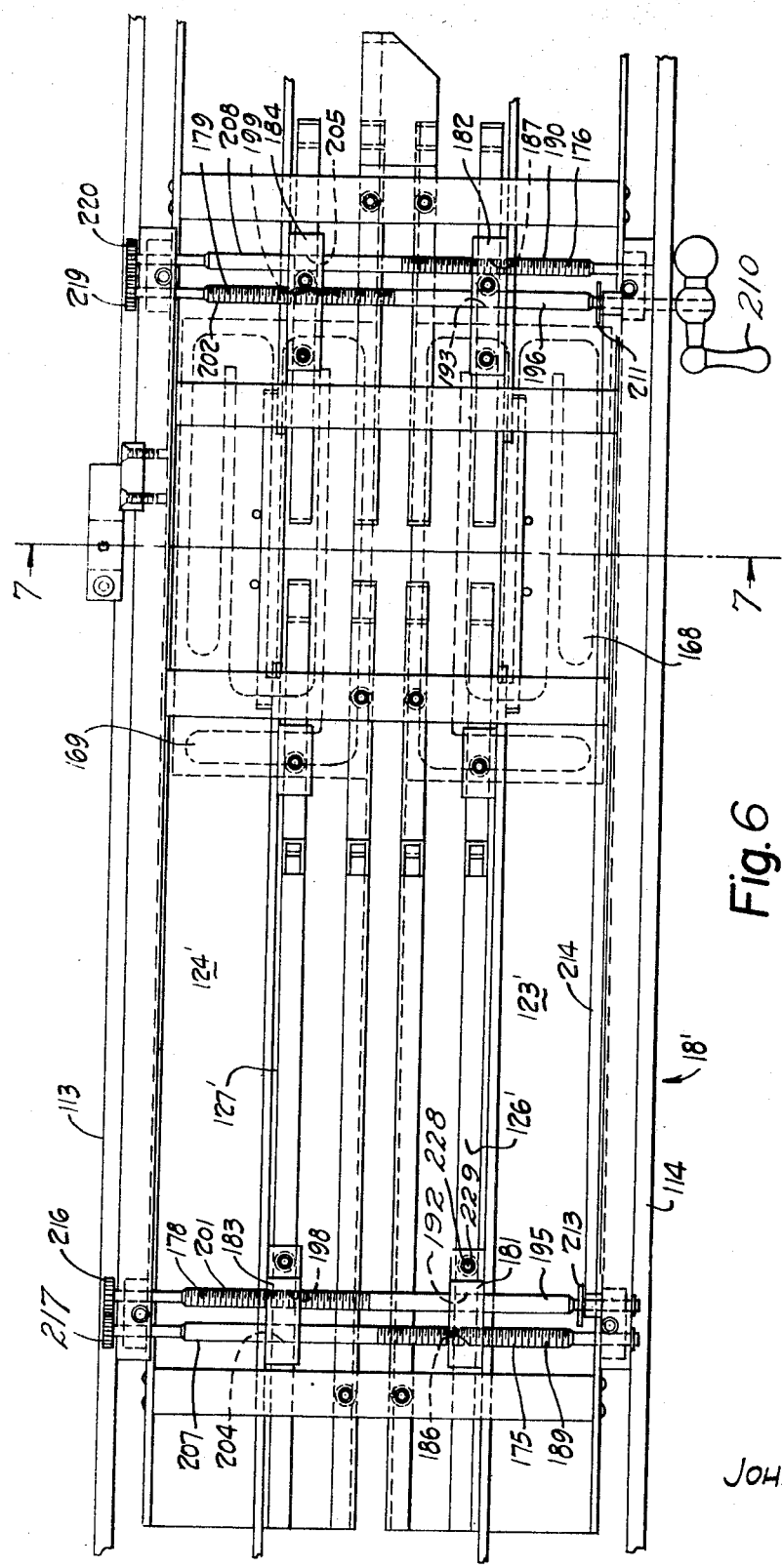
FIG. 6 is a top plan view, with the burner removed and hoses broken away for clarity, of a horizontal or conveyor feed mechanism embodying another preferred form of this invention.
Figure 7:
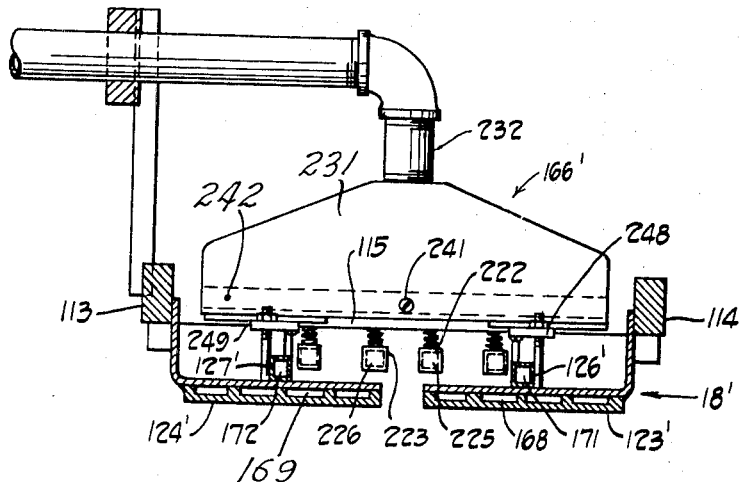
FIG. 7 is a sectional view, including the burner, taken along the lines 7—7 of FIG. 6.

Another preferred form of conveyor or horizontal feeder embodying this invention is indicated at 18' in FIGS. 6 and 7 wherein like reference characters refer to like elements and structures as in the feeder 18 just described.

Feeder 18', also, includes means, however, to protect the article to be printed against excess heat caused by the continued use of a heater or gas burner for preconditioning the surface to be printed, with a consequent increase and build-up of heat within the adjacent metal parts of the feeder.

Figure 8:
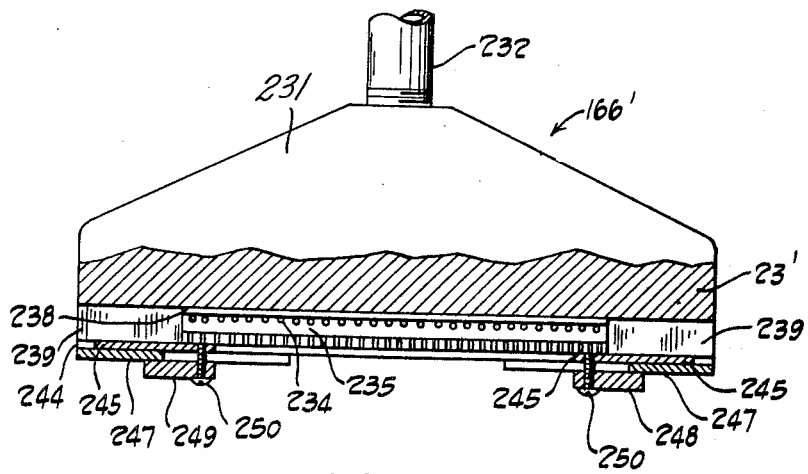
FIG. 8 is an elevation, on an enlarged scale and partly in section of the burner shown in FIG. 7.

To this end feeder 18', includes side plates 113 and 114 and a drive mechanism and pushers for advancing the respective articles to be printed to a pick-off station, which conveniently are the same as those in feeder 18. Conveyor 18' also includes a burner 166', FIGS. 7 and 8 which has the same purpose and function, in preconditioning the surface to be printed, as burner 166 of conveyor 18.

In addition, feeder 18' includes plates 123' and 124', which have the same function and purpose as plates 123 and 124 of feeder 18, but which are provided with interior channels, conduits or passages 168 and 169, respectively, through which water or other coolant is circulated in the manner to be hereinafter more fully explained.

The water or coolant is circulated through plates 123' and 124' so as to prevent heat building up therein, due to the use and action of the gas burner 166', and, thereby, to protect the articles being fed through and by the feeder from deleterious effects due to excessive heating of the metal portions of the feeder 18'.

Feeder 18', also, includes side guides 126' and 127', respectively, which are made hollow or provided with water or coolant passages 171 and 172, respectively, at least adjacent burner 166', FIG. 7, to and for the same purpose as passages 168 and 169.

In order to vary the width of the feeder in accordance with the diameter or width of the articles being fed, side guides 126' and 127' are supported on fore and aft adjusting screws 175 and 176 (for guide 126') and 178 and 179 (for guide 127'), FIG. 6, for coincident and co-ordinated lateral movement toward and away from the longitudinal center of feeder 18'. The adjusting screws are mounted for relative rotation on sides 113 and 114, respectively, as well as within carrier blocks 181, 182, 183 and 184 to which the sides guides are mounted. More particularly, side guide 126' is mounted on carrier blocks 181 and 182 which are internally threaded at 186 and 187, respectively, to engage similar threads 189 and 190 on adjusting screws 175 and 176, respectively, and have apertures 192 and 193, respectively, for sliding over the non-threaded portions 195 and 196 of adjusting screws 178 and 179, respectively. Similarly, side guide 127' is mounted on carrier blocks 183 and 184, which are internally threaded at 198 and 199, respectively, to engage similar threads 201 and 202 on adjusting screws 178 and 179, respectively, and have apertures 204 and 205, respectively, for sliding over the non-threaded portions 207 and 208 of the adjusting screws 175 and 176, respectively.

One adjusting screw 179, for example, is provided with a handle 210 for rotating the same to advance and retract the carrier block threadably engaged therewith. In order to ensure simultaneous and similar movement of both side guides and of both ends of both side guides the other adjusting screws, 175, 176 and 178, are driven from adjusting screw 179 as by suitable sprockets 211 and 213 on adjusting screws 179 and 178, respectively, and a chain 214, extending between and operatively engaging sprockets 211 and 213, and mutually engaging gears 216 and 217, on adjusting screws 178 and 175, respectively, and 219 and 220, on adjusting screws 179 and 176, respectively. Thus, when handle 210 is turned both side guides 126' and 127' are advanced or retracted, relative to the longitudinal center of the feeder 18', in unison and in equal amounts.

Feeder 18' also preferably includes two longitudinally extending upper guides or cage members 222 and 223. Upper guides 222 and 223 are also hollow to provide water or coolant passages 225 and 226, respectively, and are conveniently fixed guides, being mounted on tie bars 115.

Each water or coolant passage is provided at each end with a suitable fitting 228, for the reception of a hose or other conduit 229 for conducting the water or coolant to and from the passage and the water or coolant passages are conveniently connected in series, by a plurality of hoses 229, with each other and with a source of supply so that the water or coolant flows into and out of each passage in succession until it leaves the last passage. Thus, flow through all of the coolant passages may be controlled by a single valve, solenoid or other type, not shown. The cooling of the guides and plates, together with the burner, provides for proper preconditioning of the surface to be printed without deleterious effect due to excessive heat on the remaining parts and portions of the article because of engagement with the feeder. The adjusting means provides ready adjustment of the feeder to the width of the article to be printed, in accordance with the precepts of this invention, as set forth above.

Feeder 18' may be provided with a burner such as 166 or with burner 166', as shown. Burner 166' includes means whereby the effective length of the burner (transverse dimension, relative to the direction of travel) may be varied in unison with and to the same degree as the feeder width (distance between the side guides). To this end, burner 166', FIG. 8, includes a housing 231, having means 232 for connection to a gas source and an internal passage feeding a plurality of orifices 234 in hollow burner member or distributor 235 which is supported in a suitable groove 238 in the housing 231 and is closed at both ends by plugs 239. Member 235 and plugs 239 are held in place in burner housing 231 by any suitable means such as set screws 241 and/or roll pins 242.

Housing 231 is countersunk adjacent groove 238, as at 244 to provide a slideway for slides 245, one of which is disposed at each end of the housing, and each of the slides 245 are held in place by a plate 247, which is brazed or otherwise held to the housing 231 and is conveniently U-shaped to extend around the burner orifices 234.

Each slide 245 is adapted to retract and advance or slide back and forth from a position overlying the adjacent plug to a position overlying a portion or member of the gas orifices 234 and the motion is obtained by interconnecting each said slide with the adjacent side guides 126' and 127', respectively.

The connection is so made that the width (distance, transverse of the feeder) of the exposed orifice 234 is equal to or slightly less than the distance between the side guides and is varied by the action of the slides in unison with and to the same degrees as the distance between the side guides varies, as the side guides are adjusted in the manner and for the purposes set forth above. To this end, a bracket, plate or other suitable means 248 and 249, is mounted on each side guide 126' and 127', respectively, and is in turn connected by a suitable pin 250 to the adjacent slide 245.

Modifications, changes and improvements to the preferred forms of this invention herein particularly illustrated and described may occur to those skilled in the art who come to understand the principles and precepts thereof. Accordingly, the scope of the patent to be issued herein should not be limited to the particular embodiments of the invention herein depicted and described, but by the advance by which the invention has promoted the art.

I claim:

1. Apparatus for causing relative motion between adjacent articles being continuously advanced, individually, in a lineal direction, said apparatus comprising continuously moving drive means said drive means comprising a pair of laterally spaced parallel endless chain means, a pair of laterally spaced, axially aligned sprocket means having circumferential periphery means of predetermined radius over which said drive means travels, contact means comprising a plurality of rod means extending between said endless chain means and pusher means mounted on each said rod means midway between said drive means for engaging and moving a said article, rigid link means supporting said rod means with their axes a fixed distance, on a radial line of said sprocket means, from said drive means as it passes over at least a portion of said circumferential periphery, said link means interconnecting each said end of said rod means with the adjacent said endless chain means, means to deposit an article before each said pusher means; adjustable supporting structure for the aforesaid apparatus, comprising a horizontal support plate, vertical screw means supporting said plate and means for operating said screw means together to adjust the vertical position of said plate; a frame structure comprising sides rotatatively supporting said sprocket means, cross members joining said sides together and means slidably mounting the sides on the said horizontal support plate for horizontal movement parallel to the direction of article advance; article supporting means comprising level plates carried by said frame structure, spaced to form a gap accommodating said pusher means and support articles engaged thereby; guide means carried by said frame structure for engaging the sides of said articles at the point to which they are moved by said pusher means; and cam means adjacent said gap for rotatively moving the said pushers about their respective rod axes so that the said articles are delivered in a state of dwell for pickoff at the said point to which they are moved by said pusher means.

2. Apparatus according to claim 1, comprising also screw means for adjusting the transverse position of said guide means for engaging the sides of said articles, and drive means for operating the said screw means for moving the said guide means equally and oppositely, so as to adjust the same symmetrically about a predetermined line parallel to the direction of article advance so as to accommodate articles of differing widths.

References Cited

UNITED STATES PATENTS

| | | | |
|---|---|---|---|
| 1,971,875 | 8/1934 | Pert | 198—170 |
| 2,308,591 | 1/1943 | Duffy | 198—204 |
| 2,706,034 | 4/1955 | Russell | 198—204 |
| 2,803,334 | 8/1957 | Kitson | 198—204 |

RICHARD E. AEGERTER, Primary Examiner

U.S. Cl. X.R.

198—204